Dec. 7, 1965 A. A. RASCH 3,222,175

PROCESS FOR FORMING METALLIC NONSILVER IMAGES

Filed Nov. 29, 1961

Arthur A. Rasch
INVENTOR.

BY R. Frank Smith
Lawrence H. Willis
ATTORNEYS

United States Patent Office 3,222,175
Patented Dec. 7, 1965

3,222,175
PROCESS FOR FORMING METALLIC NONSILVER IMAGES

Arthur A. Rasch, Rochester, N.Y., assignor to Eastman Kodak Company, Rochester, N.Y., a corporation of New Jersey Filed Nov. 29, 1961, Ser. No. 155,735
9 Claims. (Cl. 96—36)

The present invention relates to photography and more particularly to a process of forming images in metallic layers by contacting such layers with an exposed silver halide emulsion layer in the presence of certain process solutions.

Photomechanical printing plates, printed circuits, and the like, have often been prepared in the past by employing an etching solution to remove metal from metal surfaces not otherwise protected by an imagewise etch resist. In such processes, a number of steps are required, for example, exposure of a light-sensitive layer coated on a support, development by removal of unexposed, unhardened portions of such a coating after exposure, and the application of a strong acid solution to bring about etching in particular areas. The present invention has found a novel photographic method in which metal can be removed from a metal surface in an imagewise manner without requiring a light-sensitive resist coating or a strong acid etching solution, and without requiring the number of steps normally involved in a process of the prior type.

The present invention has for an object to provide a novel process employing a photographic silver image to obtain imagewise control of removal of metal from metal surfaces. Another object is to provide suitable materials for use in said process avoiding the need for an imagewise resist or strong acids in an etch process. Other objects will become apparent from a reading of the specification and appended claims.

The objects of the present invention are accomplished by placing a metal surface to be etched in surface contact with an exposed silver halide emulsion layer which is in a particular stage of processing, i.e., developing or fixing, or is fully processed, in which the contacting between the metal surface and the exposed emulsion layer is carried out in the presence of certain process solutions. The process solutions of the invention comprise (A) a silver halide developing solution where the emulsion layer has been previously exposed and is in the stage of development, (B) a silver halide fixing solution where the exposed emulsion layer has been previously exposed and developed, and (C) a weakly acid solution containing a sequestering agent and fluosilicate ion where the emulsion layer has been previously exposed and fully processed. In the latter case (C), the two-ply combination of metal surface and photographic emulsion layer is irradiated with infrared radiation as directed onto the support side of the photographic element.

While it is not known how etching in the metal surface is controlled by the contacting silver image, it appears that the following reactions are involved to bring about the etched effect.

For example, it appears that a developing silver image in a conventional silver halide emulsion layer when placed in contact with a metal of the invention such as aluminum, for example, will control the extent and rate of the following reaction.

$$Al+3OH^- \rightarrow AlO_3^{\equiv}+1\tfrac{1}{2}H_2$$

It appears also that a developed, but unfixed image in a conventional silver halide emulsion layer containing fixing solution, when placed in contact with an aluminum layer for example, will control the extent and rate of the following reaction.

$$Al+3Ag^+ \rightarrow Al^{+++}+3Ag$$

Moreover, a fully processed emulsion layer, that is, one containing a silver image and having silver halide fixed out, which has been treated with a weakly acid solution of a sequestering agent and fluosilicate ion, will control the extent and rate of the following reaction when in surface contact with an aluminum surface, for example, and when irradiated with infrared radiation as previously indicated.

$$Al+3H^+ \rightarrow Al^{+++}+1\tfrac{1}{2}H_2$$

The control that is exerted by the contacting silver image in each case will cause a secondary image to form in the metal surface. Although in some cases, some etching occurred in all areas of the contacting metal surface, the degree of accelerated etching in particular areas of the metal surface, as controlled by the silver image in the contacting emulsion layer, was such that good etch results were obtained in all processes of the invention. The exact mechanisms through which the silver image in the emulsion layer controls the present etching effects, that is, reactions of metals with components of the system, is not known. As will be apparent hereinafter, direct positives or a negative, i.e., reversed, reproduction of the contacting silver image can be obtained in the etching metal surface by a suitable choice of system and materials. The exact mechanisms which lead to either positive or reversed effects are not known at this time.

The invention is further illustrated by way of the accompanying drawing in which.

Figure 1:
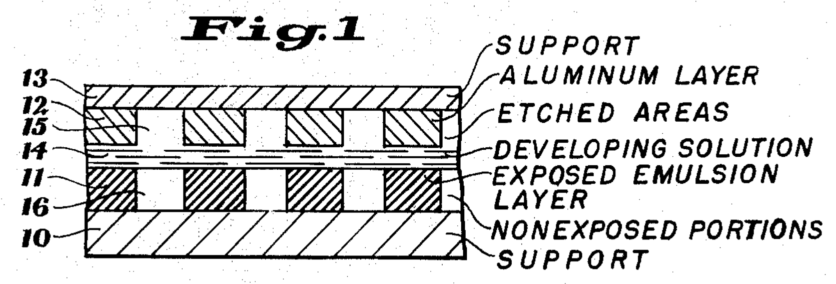
FIG. 1 illustrates a process of the invention employing a developing silver halide emulsion layer.

The metals found preferred for etching according to the present invention comprise aluminum, cadmium, magnesium, zinc, indium, copper, and germanium. Other lesser reactive metals can also be employed in the invention particularly where very thin layers are used, for example, in materials which have such metals as evaporated layers on a support. In some cases, the lesser reactive metals are more favorably employed where more highly alkaline solutions are applied in the processing or etching step. The preferred manner of employing the metals for etching and image formation according to the invention comprises a layer of the metal on a suitable support wherein the layer is deposited on the support by a well-known manner, such as by evaporation, vaporized spraying, etc. Suitable supporting materials can comprise glass, film base (e.g., cellulose acetate, cellulose nitrate, cellulose acetate butyrate, and the like), synthetic materials (e.g., polyethylene, polypropylene, polystyrene, polyethylene terephthalate, and the like), etc.

According to the present invention, the metal surface to be etched is normally placed in surface contact with an exposed photographic silver halide emulsion layer which is in a particular stage of processing such as developing, fixing, or which has been fully processed. For example, when a metal surface is in surface contact with an exposed silver halide emulsion which is being developed, i.e., the contacting is carried on in the presence of a silver halide developing solution, it was found that the metal surface became etched in the areas of said surface corresponding to the unexposed areas of the emulsion layer. Where thin metal layers are employed, the etching can be allowed to continue until an imagewise transparency in the metal layer is obtained.

In accordance with the present invention, the photographic elements employed therein ordinarily comprise gelatino-silver-halide developing-out emulsions, e.g., gelatino-silver-chloride, -chlorobromide, -chloroiodide, -chlorobromiodide, -bromide, and bromiodide developing-out emulsions. These emulsions can be coated in the usual manner on any suitable support, e.g., glass, cellulose nitrate film, cellulose ester film, polyvinylacetyl resin film, paper, or metal. The dispersing agent for the silver halide can be gelatin or other hydrophilic materials such as collodion, albumin, cellulose derivatives and synthetic resins. The emulsions of the invention can contain sensitizers for said emulsions, for example, chemical sensitizers, optical sensitizers, etc., as described in such U.S. Patents as 2,540,085; 2,716,062; 1,846,301; and 2,739,149. The emulsions can be stabilized according to a well known method, for example, as described in such U.S. Patents as 2,728,663 and 2,728,665, or can contain antifoggants as described in U.S. Patent 2,448,060. The emulsions can also contain oxide polymers which are well known and have been described in such U.S. Patents as U.S. 2,423,549 and 2,441,389. In short, photographic emulsions of the invention can comprise emulsions well known in the art, which may or may not contain addenda to improve the character of such emulsions. Preparation of the photographic silver halide emulsions of the invention can be according to the description in a number of U.S. and foreign patents, for example, as described in U.S. 2,618,556.

Suitable developing agents for use in the invention can include any of the well known developing agents such as N-monomethyl-p-aminophenolsulfate, dihydroxy benzene, hydroquinone, hydroquinone compounds (e.g., chlorohydroquinone, dichlorohydroquinone, bromohydroquinone), 1-phenyl-3-pyrazolidone and its derivatives, triaminophenols (e.g., 2,4,6-triaminophenol), catechol, pyrogallol, and the like, etc. Suitable 1-phenyl-3-pyrazolidone developing agents include 1-phenyl-4,4-dimethyl-3-pyrazolidone, 1-p-aminophenyl-4-methyl-4-propyl-3-pyrazolidone, and 1 - p-chlorophenyl-4-methyl-4-ethyl-3-pyrazolidone. The developing composition of the invention can also contain combinations of these developing agents.

Suitable silver halide solvents for use in processing compositions of the present invention can comprise any of the well-known silver halide solvents. For example, alkali metal thiosulfates, such as sodium thiosulfate, and potassium thiosulfate; alkali metal thiocyanates, such as sodium thiocyanate, and potassium thiocyanate; ammonium thiosulfate; ammonium thiocyanate; thioureas; thioglycolic acid; alkali metal selenocyanates, such as sodium selenocyanate, and potassium selenocyanate; thioglycerol; aminoethanethiols; etc.

Processing solutions of the invention incorporating fluosilicate ion can normally be prepared as an aqueous solution into which a soluble form of fluosilicate is added. A suitable range of concentration comprises from about 0.1 g. to about 3.0 g. per liter of such fluosilicate compounds as magnesium fluosilicate, sodium fluosilicate, and the like. Sequestering agents useful in the invention comprise any of a number of known agents such as the alkali metal salts (e.g., sodium, potassium and lithium) of citric acid, oxalic acid, tartaric acid, ascorbic acid, etc.; and nitrogen-containing polycarboxylic acids, such as ethylenediamine tetraacetic acid, 1,3-diamino-2-propanol tetraacetic acid, 1,2-diamino-cyclohexane-N,N-tetraacetic acid, and the alkali metal salts of these acids, for example, ethylenediamine tetraacetic acid tetrasodium salt, ethylenediamine tetraacetic acid tetrapotassium salt, etc. The sequestering agents described can, of course, be used singly or in combination. Other useful sequestering agents have been disclosed in "Organic Sequestering Agents," by S. Chaberek and A. E. Martell, published 1959 by John A. Wiley and Sons.

The concentration of the sequestering agent in the processing solution can vary over a wide range. For example, the sequestering agent can be present in the solution in the range from about 2 grams to about 25 grams per liter with a more useful concentration of sequestering agent being in the range from about 5 grams to about 10 grams per liter of solution.

The invention will now be further illustrated by reference to the accompanying drawing:

In FIG. 1 a support 10 having an exposed silver halide emulsion layer 11 thereon is brought into contact with an aluminum layer 12 carried on a support 13 in the presence of a developing solution 14. According to the process shown in FIG. 1, etched areas 15 are formed in the aluminum layer 12 corresponding to the nonexposed portions 16 of the silver halide emulsion layer.

Figure 2:
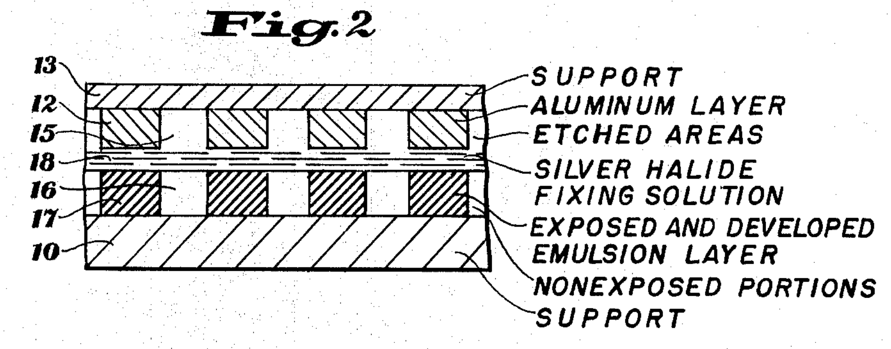
FIG. 2 illustrates a process of the invention employing a fixing silver halide emulsion layer.

In the process shown in FIG. 2, an exposed and developed silver halide emulsion layer 17 carried on a support 10 is brought into contact with an aluminum layer 12 on a support 13 in the presence of a silver halide fixing solution 18. According to the process, etched areas 15 are formed in the aluminum layer 12 corresponding to the nonexposed portions 16 in the silver halide emulsion layer.

Figure 3:
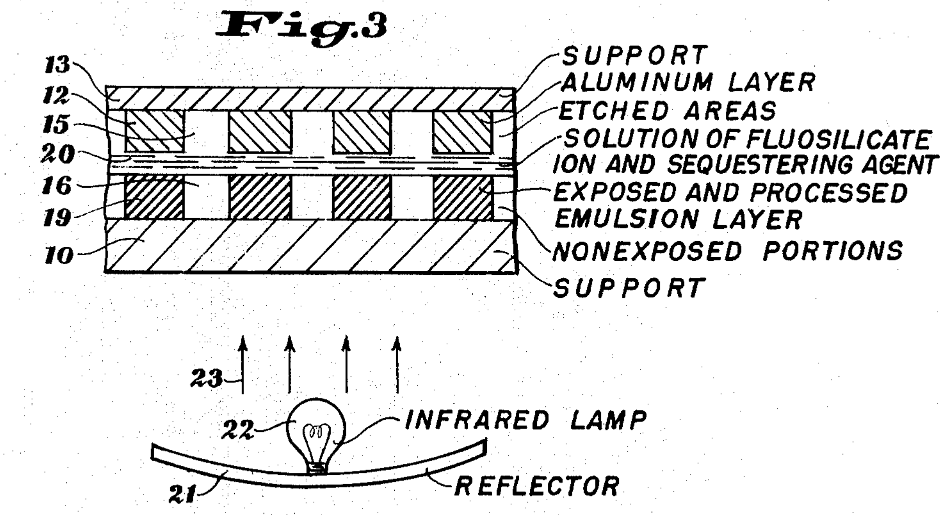
FIG. 3 illustrates a process of the invention employing infrared radiation, a fully processed silver halide emulsion layer and a weakly acid solution of sequestering agent and fluosilicate ion.

In FIG. 3, a process of the invention is shown in which an exposed and fully processed silver halide emulsion layer 19 on a support 10 is brought into contacting relationship with an aluminum layer 12 on a support 13 in the presence of a solution 20 comprising a sequestering agent and fluosilicate ion. According to the process, etched areas 15 are formed in the aluminum layer 12 corresponding the nonexposed portions 16 in the silver halide emulsion layer. According to the process shown in FIG. 3, the two-ply combination is irradiated with an infrared radiation lamp 22 as reflected from a reflector 21 in which infrared radiation 23 is directed to the support side of the photographic element employed in the process. The support comprises an infrared transparent material, such as cellulose acetate film base.

The invention will be further illustrated by reference to the following examples.

EXAMPLE 1

A photographic element comprising an acetate support having a layer of positive-speed, fine-grain bromiodide emulsion coated thereon was exposed to a line negative in the usual manner and then bathed for 5 second in a solution of the composition of Table I.

*Table I*

| | | |
|---|---|---|
| Hydroquinone | g.. | 35.0 |
| Sodium sulfite | g.. | 80.0 |
| Sodium hydroxide | g.. | 40.0 |
| Water to | liter.. | 1.0 |

After bathing in the above solution, the exposed element was rolled in contact with a strip of aluminum coated Mylar sheet as purchased from Alexander Vacuum Research Inc., New York 17, N. Y., wherein the emulsion layer was in surface contact with the aluminum layer. After a short interval, the layers were separated, showing that the aluminum had dissolved more rapidly in areas corresponding to the unexposed areas of the developing film than in areas corresponding to the image areas of the contacting emulsion layer to form a direct copy of the developing image in the aluminum layer.

Reversed etching effects can also be obtained according to the process of the present example By reversed effects, we mean a negative of the silver image in the emulsion layer being formed in the contacting metal layer. One way to obtain reversed effects according to the example is by the addition of from about 15 to about 30 grams per liter of sodium thiosulfate to the developer composition of Table I. Another method comprises the addition of a thio-compound to the composition of Table I. A suitable thio-compound for this purpose can comprise, for example, thioglycerol.

Mylar sheet of the example is a polyester film of polyethylene terephthalate resin available from E. I. du Pont de Nemours and Co.

EXAMPLE 2

A gelatino silver bromide emulsion was coated on the aluminum layer of an evaporated aluminum coated Mylar strip such as shown in Example 1. The emulsion layer was then exposed to a line negative in the usual manner, developed for 4 minutes in a developer of Table II, after which the composite material was bathed for 30 seconds in a stop bath of Table III.

*Table II*

| | | |
|---|---|---|
| Water (90° F.) | ml | 500.0 |
| Sodium sulfite (desiccated) | g | 30.0 |
| Paraformaldehyde | ml | 7.5 |
| Sodium bisulfite | g | 2.2 |
| Boric acid | g | 7.5 |
| Hydroquinone | g | 22.5 |
| Sodium carbonate, monohydrate | g | 50.0 |
| Potassium bromide | g | 1.6 |
| Water to | liter | 1.0 |

*Table III*

| | | |
|---|---|---|
| Water | ml | 500.0 |
| Acetic acid (28% solution) | ml | 64.0 |
| Sodium sulfate (desiccated) | g | 45.0 |
| Water to | liter | 1.0 |

A fixing solution of Table IV was then surface applied to the emulsion side of the present element and the element was the allowed to remain at room temperature for a brief interval. During this interval, it was observed that the unexposed areas of the emulsion layer cleared rapidly and, subsequently, the aluminum under these areas dissolved while the aluminum under the developed areas dissolved much less rapidly. In this way, a direct copy of the silver image was formed in the aluminum layer.

*Table IV*

| | | |
|---|---|---|
| Water | ml | 600.0 |
| Sodium thiosulfate | g | 360.0 |
| Ammonium chloride | g | 50.0 |
| Sodium sulfite (desiccated) | g | 15.0 |
| Acetic acid (28% solution) | ml | 48.0 |
| Boric acid | g | 7.5 |
| Potassium alum | g | 15.0 |
| Water to | liter | 1.0 |

EXAMPLE 3

A photographic negative silver image contained in a fully processed emulsion layer as coated on an infrared transparent support was bathed in a bath of the composition of Table V for a short interval to impregnate the emulsion layer thereof.

*Table V*

| | | |
|---|---|---|
| Glacial acetic acid | ml | 9.0 |
| Ethylenediamine tetraacetic acid tetrasodium salt | g | 30.0 |
| Sodium fluosilicate | g | 3.0 |
| Water to | liter | 1.0 |

pH 3.5 (Adjusted with concentrated HCl).

After soaking, the emulsion coating was then rolled in surface contact with an aluminum coating as contained on a Mylar support (see Example 1). The two-ply combination was then given an infrared radiation exposure comprising directing the radiation to the support side of the photographic element. According to the example, aluminum under the nonimage areas of the contacting emulsion layer dissolved at a faster rate than under the silver image areas of the emulsion layer to form a direct copy transparency of the silver image in the aluminum layer.

Any convenient source of infrared radiation can be employed in the example, for example, an electric filament which is partially enclosed in a suitable reflector. Another radiation source comprises a standard 500-watt infrared bulb with internal reflector, operated under overload conditions of 800-watt imput.

EXAMPLE 4

A positive speed fine-grain bromiodide emulsion layer carried on an acetate support was exposed to a positive line object and bathed for 12 seconds in a solution of the composition of Table VI.

*Table VI*

| | | |
|---|---|---|
| Hydroquinone | grams | 35.0 |
| Sodium sulfite | do | 80.0 |
| Sodium hydroxide | do | 28.5 |
| Water to | liter | 1.0 |

After bathing, the emulsion layer of the photographic element was rolled in surface contact with an aluminum layer coated on Mylar support (see Example 1). According to the example, the aluminum under the developing image of the photographic emulsion dissolved much less rapidly than under the nonexposed areas to form a direct copy of the developing image in the aluminum layer.

The aluminum image was next bathed in an etch solution of the composition of Table VII.

*Table VII*

| | | |
|---|---|---|
| Glacial acetic acid | ml | 2.5 |
| Ethylenediamine tetraacetic acid tetrasodium salt | grams | 7.5 |
| Sodium fluosilicate | do | 0.25 |
| Water to | liter | 1.0 |

After 4 minutes in a bath of Table VII, substantially all of the aluminum was removed in the areas corresponding to the nonexposed areas of the emulsion layer. Aluminum was also removed from image areas by this treatment, but a continuous layer remained having an optical transmission density of 0.70 density unit as measured on a standard densitometer according to a well known procedure.

By employing a counter-etch bath such as a 2 percent phosphoric acid solution containing 0.8 gram per liter of magnesium fluosilicate, a lithographic plate was prepared in which the aluminum layer was hydrophilic and the exposed Mylar support was oleophilic. Good quality prints were obtained using the plate of the present type in a well known lithographic printing process.

EXAMPLE 5

A positive speed fine-grain bromiodide emulsion layer carried on an acetate support was exposed in a well known manner to a positive line object and bathed for 12 seconds in a developer of the following composition.

*Table VIII*

| | | |
|---|---|---|
| Hydroquinone | grams | 35 |
| Sodium sulfite | do | 50 |
| Sodium hydroxide | do | 20 |
| 2-amino-ethanol | ml | 10 |
| Water to | liter | 1 |

The photographic element was rolled in emulsion contact with a cadmium layer on a support in which a cadmium layer was coated thereon by a well known vacuum evaporation method. The cadmium layer had an optical transmission density of 1.4. After an interval of contact with the emulsion layer, the cadmium under the developing image dissolved more rapidly than under the nonexposed areas of the photographic emulsion to form an image in the cadmium layer which is reversed from the developed silver image in the emulsion layer. A 2-minute contacting interval was found to be sufficient to remove all of the cadmium from particular areas in the contacting metal surface.

EXAMPLE 6

A fine-grain positive speed bromiodide emulsion coated on a support was exposed in the usual manner to a positive line object and bathed for 12 seconds in a developer composition of Table VI. The photographic element was then rolled in emulsion contact with a thin zinc layer coated by vacuum evaporation on a cellulose acetate support. The zinc under the developing image dissolved more rapidly than the zinc under other areas of the emulsion layer to form an image in the zinc layer that is the reverse of the image contained in the photographic emulsion layer. Seven minutes was found to be adequate to complete the etching process in the contacting zinc surface.

EXAMPLE 7

A positive speed fine-grain bromiodide emulsion coated on a cellulose acetate support was exposed in a well known manner to a positive line object and bathed for 12 seconds in a developer having the following composition.

*Table IX*

| | | |
|---|---|---|
| Hydroquinone | grams | 35 |
| Sodium sulfite | do | 80 |
| Sodium hydroxide | do | 20 |
| Water to | liter | 1 |

The exposed photographic element was then rolled in emulsion contact with a thin magnesium layer coated by vacuum evaporation on a polyethylene coated paper support. After a short contacting interval, the two elements were separated to show etching of the magnesium coat under the image areas of the contacting photographic emulsion layer to form an image in the magnesium layer which was reversed from the image in the contacting emulsion layer. It was found that a contacting time of about 1½ minutes was sufficient to remove substantially all of the magnesium from the polyethylene coated surface in those areas which corresponded to the image areas of the exposed and developing emulsion layer.

In similar manner, except using a negative speed bromiodide emulsion, an evaporated germanium layer on Mylar support was etched according to the present example. In this case, a direct copy of the developing silver image was obtained in the germanium layer since the germanium dissolved more rapidly in areas corresponding to the nonexposed areas of the developing emulsion layer than under the silver image areas of the emulsion layer.

EXAMPLE 8

A positive speed fine-grain bromiodide emulsion coated on an acetate support was exposed in the usual manner to a positive line object and bathed for 12 seconds in a solution of the following composition.

*Table X*

| | | |
|---|---|---|
| Hydroquinone | grams | 35 |
| Sodium sulfite | do | 50 |
| Sodium hydroxide | do | 40 |
| Ethylenediamine tetraacetic acid tetrasodium salt | do | 5 |
| Water to | liter | 1 |

The wet and developing emulsion was then rolled in surface contact with an indium layer coated by vacuum evaporation on Mylar support. The indium under the areas of the emulsion layer comprising the nonexposed areas dissolved more rapidly than the indium under the image areas in the contacting emulsion layer to form an image in the indium layer which is a direct copy of the developing photographic silver image. A 5-minute contacting time was found sufficient to complete the process of the example.

EXAMPLE 9

A positive speed fine-grain bromiodide emulsion coated on an acetate support was exposed in a well known manner to a positive line object and bathed for 30 seconds in a solution of the following composition.

*Table XI*

| | | |
|---|---|---|
| Titanium trichloride (20% solution) | ml | 75 |
| Ethylenediamine tetraacetic acid tetrasodium salt | grams | 100 |
| Sodium acetate | do | 25 |
| Potassium bromide | do | 5 |
| Water to | liter | 1 |

pH 3.8 (adjusted with concentrated HCl).

The wet emulsion was then rolled in surface contact with a copper layer coated by a well known vacuum evaporation method onto Mylar support. A short contacting time resulted in copper being dissolved more rapidly under the developing image of the emulsion layer than under the nonimage areas to form an etched image in the copper layer which was the reverse of the silver image in the emulsion layer. A 7-minute contacting time was found sufficient to complete the process of the example.

Development of the latent image in the present example is presumed to result from cuprous ions being generated during contact of the treated emulsion layer with the copper surface.

EXAMPLE 10

The present example shows the types of images, either positive or reversed, as produced using a positive-speed, fine-grain, bromiodide emulsion in combination with various metals of the invention where the developing composition and method of Example 1 are employed. "Positive" or "Reversed" conforms to language used in previous examples and refers to the image being formed in the metal surface as related to the silver image in the contacting emulsion layer. The metals of the example were contained as evaporated coatings on a plastic support, such as Mylar sheet.

*Table XII*

| Type of metal layer: | Etched image obtained |
|---|---|
| Aluminum | Positive. |
| Cadmium | Reversed. |
| Copper | Do. |
| Germanium | Do. |
| Indium | Positive. |
| Magnesium | Reversed. |
| Zinc | Do. |

While reversed etch effects can be obtained employing different metals as shown in the above table, improved etch results, without reversing, can also be obtained within the invention by employing changes in particular compositions. For example, the quality of copper images is improved by substituting an acid developer containing titanium trichloride and ethylenediamine tetraacetic acid for an alkaline developer as shown in Example 1, for example. The etching effects in cadmium layers are also found to be improved by the process of the invention where an aliphatic hydroxy amine such as 2-amino ethanol was added to the processing solution. It has been found also that either direct positive or reversed etching can be obtained in a particular metal surface of the invention by employing different emulsion materials. For example, in an aluminum surface a developing, positive-speed, fine-grain bromiodide emulsion gave positive etching effects whereas a Lippmann-type emulsion under the same conditions gave reversed etching effects. No explanation can be offered for the phenomenon.

Lippmann-type emulsions have been described in "Photographic Chemistry," 1, Fountain Press of London (1958), page 365.

In the invention, metals are normally employed as very thin layers, for example, as supported vacuum evaporated layers, however, useful results can also be obtained using layers of metals of the invention prepared by other methods. In such cases, the layers are normally of a thickness substantially greater than that normally obtained in vacuum evaporated materials. The preferred range of thickness for metals useful in the present invention is from about 0.5 to about 3.0 optical density units as measured on a MacBeth Quantalog Densitometer. In addition to the metals previously disclosed for use in the invention, metal salts, metal oxides, or other compounds can also be employed in cases where relatively thin layers can be prepared and where such materials are solubilized by or react with a component or by-product of photographic development, fixing, or of a solution of a sequestering agent and fluosilicate ion according to the present invention.

In accordance with the invention, certain types of printing materials can be produced. For example, by etching through to the substrate in metal coated materials, a lithographic printing plate can be prepared. In such materials, normally a metal would be used that is hydrophilic and this metal would normally be coated by a suitable method such as vacuum evaporation, onto a hydrophilic substrate such that etching forms a lithographic surface. Such a surface can also be formed using a hydrophobic metal layer and a hydrophilic substrate. In the invention, sensitive photographic emulsions can be used as the control layer for etching, thus making possible the need for less intense light sources than those normally needed for preparing lithographic printing plates.

In the invention, the etching metals can be plated with other metals such as cobalt or other compounds having high magnetic susceptibility to form magnetic images for document reproduction or recording purposes. The metal images of the invention can be chemically treated, for example, after they are formed to make name plates and other decorative materials. The etched materials of the present invention have particular utility in the printed circuit art, for example, in the preparation of microminiature circuiting materials, and the like.

In general the metal images, and in particular those images formed from the more reactive metals such as aluminum, magnesium, and zinc, may be used in additional processes to form replica images composed of other materials by employing chemical reactions that are well known. For example, the images may be converted to the metal hydroxides or oxides which will act as mordants to form colored, dye images. These metal images may also be used to initiate polymerization reactions, for example, as described in Baxendale, U.S. patent application, Ser. No. 769,082, filed October 23, 1958, and in this way polymer replicas of the metal image may be formed either directly on the image substrate or in an adjacent layer coated on a separate support. Other examples of chemical reactions that may be employed with these metal images will be obvious to those versed in the art.

The advantages of the present invention among others are that high speed photographic materials can be used to obtain etch results in metal surfaces, and that either direct positive or reversed etch effects can be readily obtained employing such materials. Moreoever, the present process is a relatively simple one and has application to a number of fields.

The invention has been described in detail with particular reference to preferred embodiments thereof but it will be understood that variations and modifications can be effected within the spirit and scope of the invention as described hereinabove and as defined in the appended claims.

I claim:

1. A process for etching imagewise a metal surface wherein the metal is selected from the class consisting of aluminum, cadmium, magnesium, zinc, indium, copper and germanium comprising (A) contacting said metal surface with an emulsion surface of a photographic element comprising (a) an infrared transparent support and (b) a photoexposed silver halide emulsion layer which has been developed to a silver image and fixed, (B) and irradiating said silver image through said infrared transparent support with infrared radiation, said irradiation being performed while said emulsion layer has imbibed therein an aqueous solution containing a sequestering agent and fluosilicate ion.

2. A process for etching imagewise a metal surface wherein said metal is aluminum, comprising (A) contacting said metal surface with an emulsion surface of a photographic element comprising (a) an infrared transparent support and (b) a photoexposed silver halide emulsion layer which has been developed to a silver image and fixed, (B) and irradiating said silver image through said infrared transparent support with infrared radiation, said irradiation being performed while said emulsion layer has imbibed therein an aqueous solution containing a sequestering agent and fluosilicate ion.

3. A process for etching imagewise a metal surface wherein said metal is cadmium, comprising (A) contacting said metal surface with an emulsion surface of a photographic element comprising (a) an infrared transparent support and (b) a photoexposed silver halide emulsion layer which has been developed to a silver image and fixed, (B) and irradiating said silver image through said infrared transparent support with infrared radiation, said irradiation being performed while said emulsion layer has imbibed therein an aqueous solution containing a sequestering agent and fluosilicate ion.

4. A process for etching imagewise a metal surface wherein said metal is magnesium, comprising (A) contacting said metal surface with an emulsion surface of a photographic element comprising (a) an infrared transparent support and (b) a photoexposed silver halide emulsion layer which has been developed to a silver image and fixed, (B) and irradiating said silver image through said infrared transparent support with infrared radiation, said irradiation being performed while said emulsion layer has imbibed therein an aqueous solution containing a sequestering agent and fluosilicate ion.

5. A process for etching imagewise a metal surface wherein said metal is zinc, comprising (A) contacting said metal surface with an emulsion surface of a photographic element comprising (a) an infrared transparent support and (b) a photoexposed silver halide emulsion layer which has been developed to a silver image and fixed, (B) and irradiating said silver image through said infrared transparent support with infrared radiation, said irradiation being performed while said emulsion layer has imbibed therein an aqueous solution containing a sequestering agent and fluosilicate ion.

6. A process for etching imagewise a metal surface wherein said metal is indium, comprising (A) contacting said metal surface with an emulsion surface of a photographic element comprising (a) an infrared transparent support and (b) a photoexposed silver halide emulsion layer which has been developed to a silver image and fixed, (B) and irradiating said silver image through said infrared transparent support with infrared radiation, said irradiation being performed while said emulsion layer has imbibed therein an aqueous solution containing a sequestering agent and fluosilicate ion.

7. A process for etching imagewise a metal surface wherein said metal is copper, comprising (A) contacting said metal surface with an emulsion surface of a photographic element comprising (a) an infrared transparent support and (b) a photoexposed silver halide emulsion layer which has been developed to a silver image and fixed, (B) and irradiating said silver image through said infrared transparent support with infrared radiation, said irradiation being performed while said emulsion layer has imbibed therein an aqueous solution containing a sequestering agent and fluosilicate ion.

8. A process for etching imagewise a metal surface wherein said metal is germanium, comprising (A) contacting said metal surface with an emulsion surface of a photographic element comprising (a) an infrared transparent support and (b) a photoexposed silver halide emulsion layer which has been developed to a silver image and fixed, (B) and irradiating said silver image through said infrared transparent support with infrared radiation, said irradiation being performed while said emulsion layer has imbibed therein an aqueous solution containing a sequestering agent and fluosilicate ion.

9. A process for etching imagewise a metal surface wherein the metal is selected from the class consisting of aluminum, cadmium, magnesium, zinc, indium, copper and germanium, comprising (A) contacting said metal surface with an emulsion surrface of a photographic element comprising (a) an infrared transparent support and (b) a photoexposed silver halide emulsion layer which has been developed to a silver image and fixed, (B) and irradiating said silver image through said infrared transparent support with infrared radiation, said irradiation being performed while said emulsion layer has imbibed therein an aqueous solution containing a sequestering agent and fluosilicate ion, said sequestering agent being selected from the group consisting of citric acid, oxalic acid, tartaric acid, ethylenediamine tetraacetic acid and 1,3-diamino-2-propanol tetraacetic acid.

References Cited by the Examiner

UNITED STATES PATENTS 2,644,756 7/1953 Land ---------------- 96—29

FOREIGN PATENTS 460,141 1/1937 Great Britain.
571,107 8/1945 Great Britain.

OTHER REFERENCES

Nationali Lithographic, "Minute Plates," Nov. 1959, page 78.

Journal of Photographic Science, "The Gevacopy Aluminum Offset Process," volume 8, 1960, pages 26–32.

Photographic Abstracts, "Coating Emulsions on Metal," J. Heidenhain, part 2, 1949, page 81.

NORMAN G. TORCHIN, *Primary Examiner.*